United States Patent [19]

Hue

[11] Patent Number: 5,432,019
[45] Date of Patent: Jul. 11, 1995

[54] SYSTEM FOR THE ELECTRICAL POWER SUPPLY OF A VEHICLE

[76] Inventor: Francis Hue, 18 rue Lyautey, 54000 Nancy, France

[21] Appl. No.: 916,209

[22] Filed: Jul. 17, 1992

[30] Foreign Application Priority Data

May 17, 1990 [FR] France ............... 90 06344

[51] Int. Cl.⁶ .............. H01M 2/20; H01M 10/38; H01M 10/44
[52] U.S. Cl. ...................... 429/10; 429/123; 429/179; 429/187; 429/50
[58] Field of Search .............. 429/99, 179, 123, 10, 429/187, 50

[56] References Cited

U.S. PATENT DOCUMENTS

| | | | |
|---|---|---|---|
| 3,988,170 | 10/1976 | Koch et al. | 429/175 |
| 4,206,274 | 6/1980 | Peels | 429/99 |
| 4,395,696 | 7/1983 | Menhard | 427/179 |
| 4,407,911 | 10/1983 | Hooke | 429/99 |
| 4,636,703 | 1/1987 | Tohya et al. | 429/99 |
| 4,770,957 | 9/1988 | Miyagawa | 429/175 |
| 4,846,295 | 7/1989 | Shepard et al. | 429/179 |
| 5,015,546 | 5/1991 | Dulaney | 429/99 |

FOREIGN PATENT DOCUMENTS

| | | | |
|---|---|---|---|
| 1093997 | 5/1955 | France | 429/98 |
| 2233719 | 1/1975 | France . | |
| 73507 | 5/1943 | Germany . | |
| 60-220576 | 11/1985 | Japan . | |
| 427428 | 12/1974 | U.S.S.R. | 428/99 |

Primary Examiner—David B. Springer
Attorney, Agent, or Firm—Weiser & Associates

[57] ABSTRACT

A system for supplying electric power to a battery operated vehicle makes use of a support plate for receiving a series of batteries. The support plate, and the batteries which it receives, include complementary mechanical and electrical connections which facilitate their interconnection. The support plate permits either a series connection, or a shunt connection of the batteries making use of conducting parts which interconnect the batteries with one another and with cables for supplying the vehicle with electric power.

36 Claims, 4 Drawing Sheets

SYSTEM FOR THE ELECTRICAL POWER SUPPLY OF A VEHICLE

BACKGROUND OF THE INVENTION

This invention relates to a system for supplying electric power to a vehicle having batteries such as, for example, a battery operated vehicle or the like.

Electrically propelled vehicles generally make use of a self-sufficient power supply which is comprised of a plurality of batteries. However, in time, these batteries are progressively discharged as the vehicle is operated. Eventually, this requires the batteries of the vehicle to be recharged. This recharging takes a relatively long period of time, which varies according to the kind and type of batteries which are used. For this reason, common practice is to recharge the batteries overnight.

As a result, battery operated vehicles are generally limited to special-service vehicles, and have not found wide application to general-service vehicles (e.g., transportation or commercial vehicles) primarily due to the limitations of battery recharging.

SUMMARY OF THE INVENTION

It is, therefore, the object of the present invention to overcome these difficulties by effectively removing the need for extended battery recharging periods in order to reduce the amount of time that the battery operated vehicle is out of service, thereby minimizing limitations to the use of such vehicles by passengers.

This and other objects are achieved in accordance with the present invention by providing a system for supplying electric power to a battery operated vehicle which employs a support plate which can receive a plurality of batteries, and which includes complimentary means for mechanically and electrically connecting the support plate and the batteries which it receives. The support plate permits a series electrical connection, or a shunt connection of batteries by including conducting parts for interconnecting the batteries with each other, and with cables for providing electric power to the point of utilization associated with the battery operated vehicle.

Such structure allows batteries to be appropriately placed onto the support plates, which then operate to support the weight of the batteries and to provide for their electrical connection with one another, and with the associated vehicle. The batteries can be retained to the support plates either resulting from their own weight, by various mechanical fasteners, or by electromagnetic action. Preferably, the support plates for receiving the batteries are manufactured as unitary elements which are molded with the necessary conducting parts for facilitating use of the support plates to receive the batteries and to interface (mechanically and electrically) with the battery operated vehicle which is to receive them.

In use, manufacture of the support plates in a manner which facilitates their incorporation into a battery operated vehicle also facilitates later disassociation of the batteries from the vehicle. To facilitate such handling, the batteries are preferably provided with articulated handles which are retractable into channels formed in the batteries.

In addition to facilitating servicing and replacement of the batteries, the system of the present invention also affords a convenient means for allowing discharged batteries to be replaced with recharged batteries. This allows the batteries to be handled as reconditioned spare units for replacement purposes (similar to replaceable gas cylinders). As a result, fresh (recharged) batteries can be distributed through road side stations to allow the operator of a battery operated vehicle to change batteries without requiring tools or special handling. Consequently, by exchanging discharged batteries for recharged batteries, the operator is permitted to continue use of the battery operated vehicle, much the same as present service stations provide for the refueling of gasoline-powered vehicles. Use of the system of the present invention is even sufficiently simple to allow for a self-service function, if desired. To assist the operator in reaching the nearest service station, a reserve battery is provided which can be accessed by an operator controlled switch.

For a further understanding of the present invention, reference is made to the following detailed description of the system of the present invention and its method of use, which are given as non-limiting examples with further reference to the accompanying drawings.

DETAILED DESCRIPTION OF PREFERRED EMBODIMENTS

Figure 1:
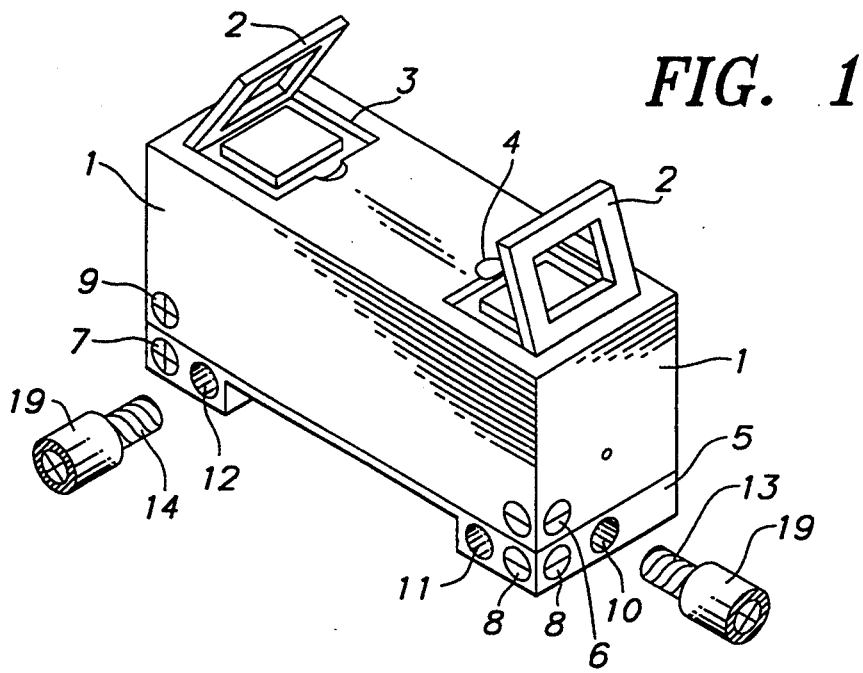
FIG. 1 is an isometric view of a battery received on a support plate in accordance with the present invention.

FIG. 1 illustrates a battery 1 having a container which is essentially equivalent to a conventional battery case. As will be discussed more fully below, this container is able to receive operative battery components (e.g., plate groups, electrolyte, etc.) which are per se known. Upper portions of the container are provided with handles 2 which are receivable within channels 3 having openings 4 for facilitating access to the handles 2 when in their retracted position (within the channels 3).

The battery 1 is received upon a support plate 5, which will be discussed more fully below. To ensure correct positioning of the battery 1 relative to the support plate 5 (i.e., correct polarity), markings are preferably provided for visual verification by the user of the system. For example, an escutcheon 6 is advantageously provided on the battery 1 to show the terminal of negative polarity, for alignment with an escutcheon 8 which indicates the negative polarity terminal of the support plate 5. An escutcheon 9 is provided on the battery 1 to show the terminal of positive polarity, for alignment with an escutcheon 7 which indicates the terminal of positive polarity of the support plate 5.

Referring again to FIG. 1, the support plate 5 includes a series of electrical connectors. For the negative terminal, both a negative longitudinal connector 10 and a negative lateral connector 11 are provided. Similar connectors are provided for the positive terminal including a positive longitudinal connector (not visible) and a positive lateral connector 12. These connectors are formed as bores for receiving copper connecting cables (either longitudinally or laterally), such as the negative connection cable 13 and the positive connection cable 14 which are shown for purposes of illustration. As is conventional, each of the connection cables 13, 14 is formed as a copper cable surrounded by an insulating sheath 19.

Figure 2:
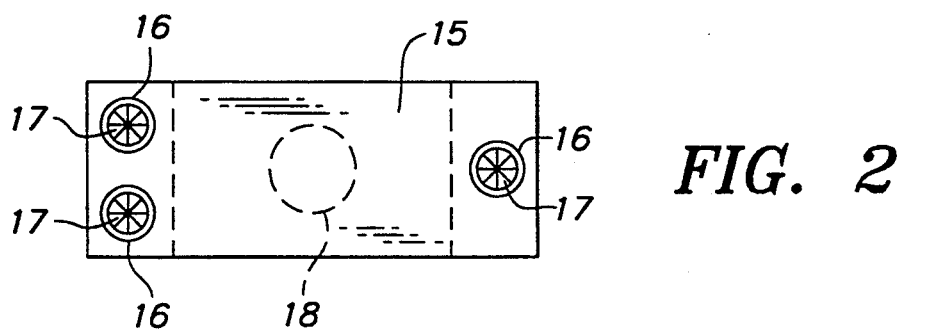
FIG. 2 is a bottom plan view of the battery.
Figure 4:
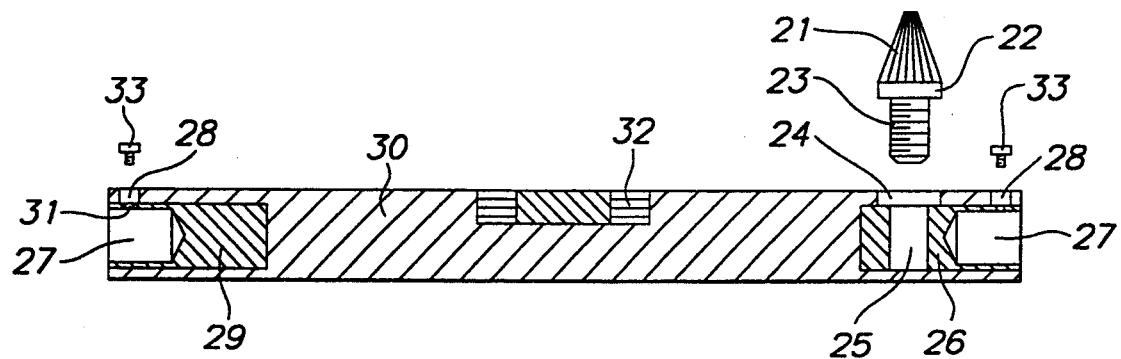
FIG. 4 is a longitudinal cross-sectional view of one of the support plates shown in FIG. 3, taken along the line 4—4.

Referring now to FIG. 2, the bottom of the battery 1 includes a pedestal 15 which is formed of an electrically insulating material, and a plurality of electrically conducting terminals 17. The terminals 17 are socket-shaped and are advantageously formed of lead or of another appropriate conducting material. The terminals 17 pass through protective areas 16 formed in the insulating material, to provide access to the terminals for connection purposes. The pedestal 15 can also include a metallic plate 18, if desired, for magnetic connection with the support plate 5. As illustrated in FIG. 4, the support plate 5 can be provided with an electromagnetic 32 for operatively engaging the metallic plate 18, to magnetically (or electromagnetically) retain the battery 1 in position on the support plate 5, as desired.

Figure 3:
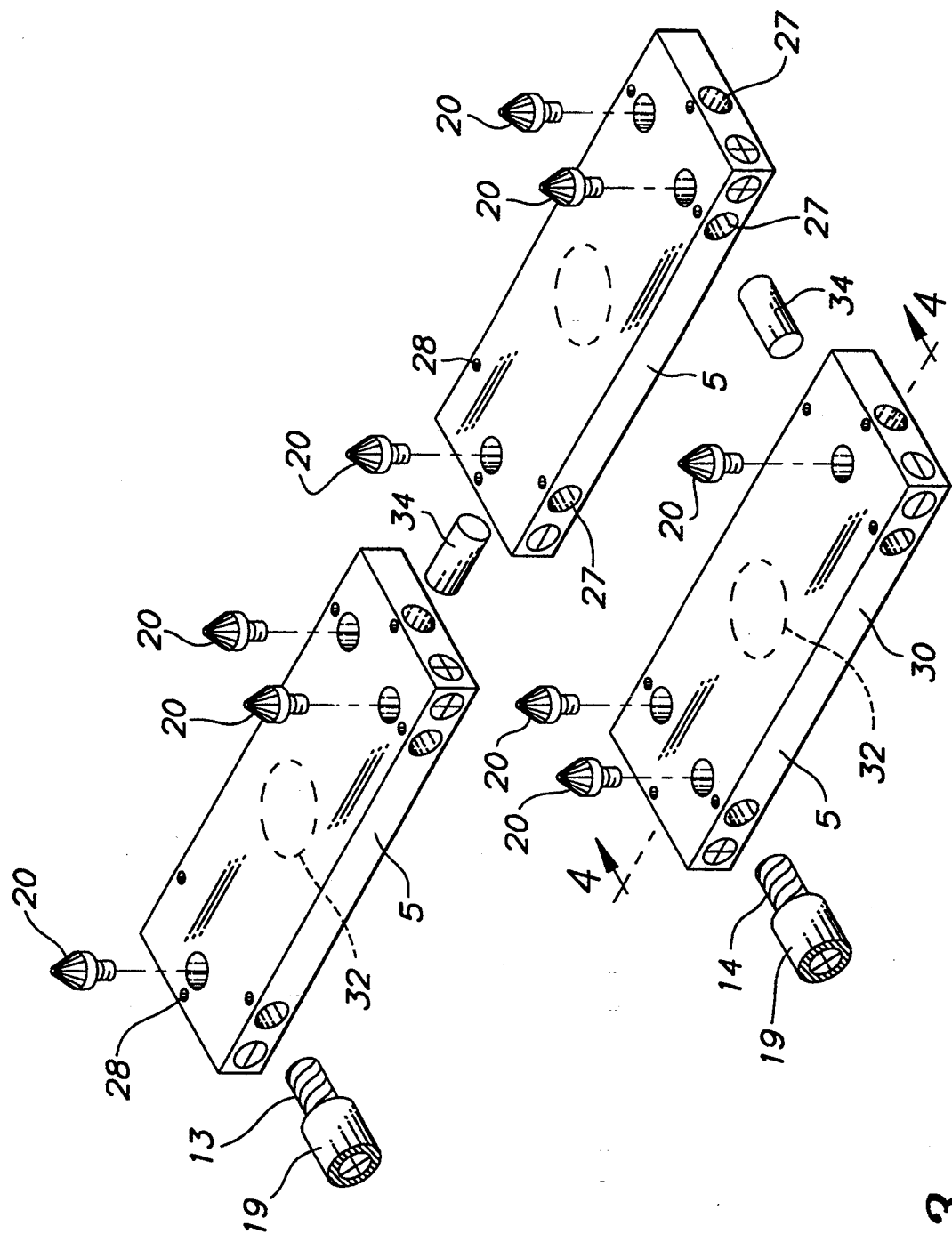
FIG. 3 is an exploded, isometric view showing an interconnection of plural support plates.

Referring now to FIGS. 3 and 4, each of the support plates 5 includes a sheathing 30 formed of an insulating material, and a series of three male terminals (preferably formed of brass) which correspond to the (socket) terminals 17 of the battery 1 (see FIG. 2). To automatically ensure correct positioning of the battery 1 upon the support plate 5 (in addition to the visual markings previously discussed), and in order to prevent mistaken placements with reverse polarity, a single terminal 20 is provided on one side of the support plate 5 (in this case the negative terminal) while two terminals 20 are provided on the other side of the support plate 5 (in this case the positive terminal). This creates an asymmetrical configuration which will allow the battery 1 to be seated upon the support plate 5 in only one possible position.

To improve their mechanical and electrical connection, the terminals 17, 20 preferably include cooperating series of longitudinal grooves 21. The terminals 20 also preferably include a series of threads 23, so that the terminals 20 can be screwed into corresponding bores 25 formed in the conducting parts 26, 29 which are received within each support plate 5 as shown. An access area 24 extends through the sheathing 30 of the support plate 5 (which surrounds the conducting parts 26, 29), for accessing the bores 25 of the conducting parts 26, 29 and for protecting the terminals 20. The terminals 20 include a flange 22 which limits threading of the terminals 20 into the bores 25 which are to receive them.

FIG. 1 shows how a single support plate 5 can be used to detachably receive a single battery 1. In this configuration, the connection cables 13, 14 are used to electrically connect the support plate 5 with the battery operated vehicle it is to service. FIG. 4 shows how a series of support plates 5 can be used to detachably receive a series connection of batteries 1. In this configuration, a series of connectors 34 are used to link terminals (the conducting parts 26, 29) of the support plates 5 with one another. The connectors 34 are received within a series of bores 27 which are formed in the conducting parts 26, 29. Longitudinal electrical connections are preferably made between bores 27 which are centrally located along the lateral edges of the support plates 5. Consequently, a direct electrical connection is made with singular, centrally located terminals 20 (i.e., a negative terminal), while connections with the dual, spaced terminals 20 (i.e., a positive terminal) are made with the internal conductor which extends between the spaced pair of terminals 20. The connectors 34 can also be used to make lateral connections between the bores 27 of adjacent conducting parts 26, 29, as desired. The bores 27 also receive the connection cables 13, 14 at appropriate end points of the series electrical connection which is established, for electrical connection with the battery operated vehicle which is to be serviced.

Each of the connectors 34 (and the connection cables 13, 14) are preferably retained in position by screws 33 which extend through bores 31 formed in the conducting parts 26, 29. An access 28 extends through the protective sheathing 30 of the support plate 5 to permit the screws 33 to be loosened and tightened as needed.

Figure 5:
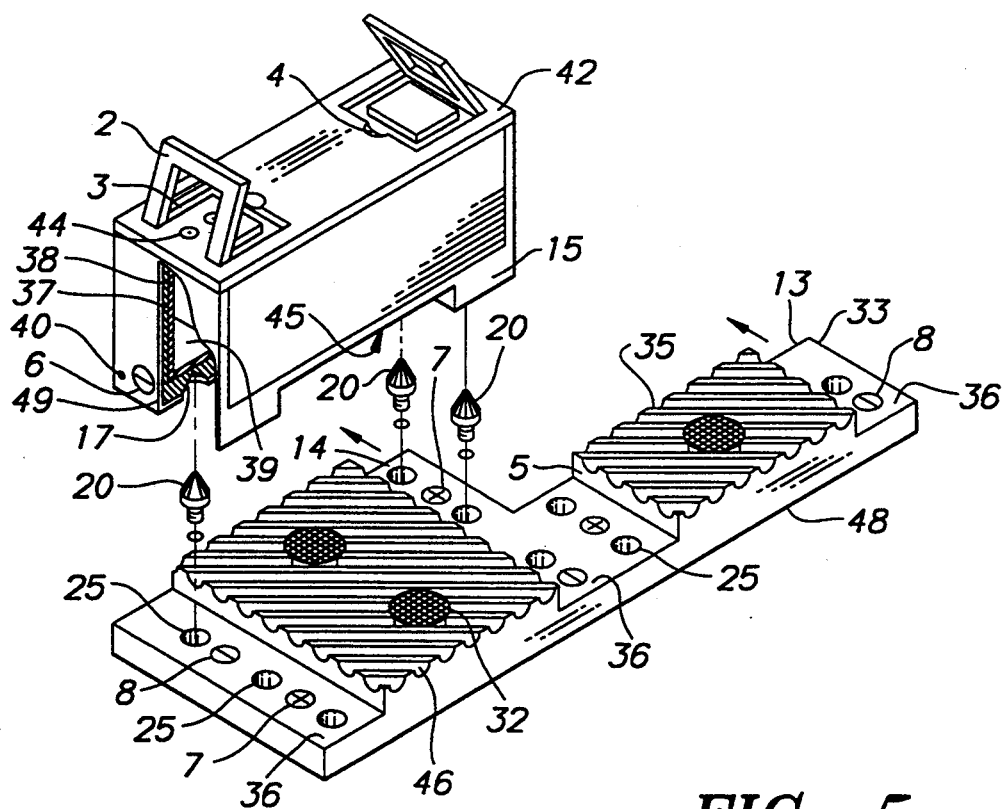
FIG. 5 is an isometric view of an alternative embodiment support plate for achieving an electrical connection similar to that of FIG. 3, and an alternative embodiment battery (in partial section) for mating with such a support plate.
Figure 6:
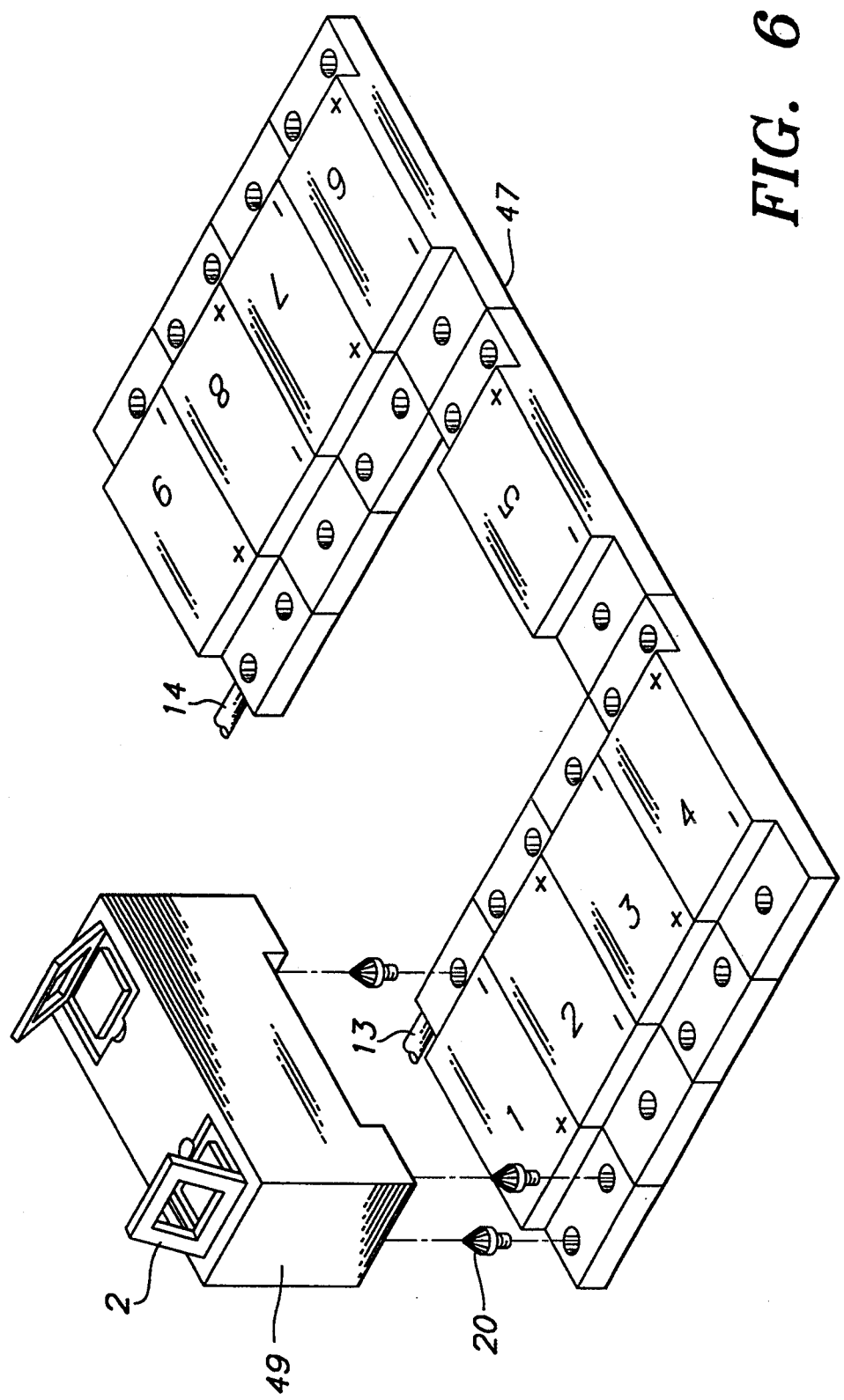
FIG. 6 is an isometric view of an alternative embodiment support plate similar to that of FIG. 5, for receiving a series of nine batteries.

FIG. 5 shows an alternative embodiment support plate 48 for receiving a plurality of batteries to develop a series electrical connection similar to that shown in FIG. 3. FIG. 6 illustrates a similarly configured support plate 47 for receiving a series of nine batteries (with polarity and position markings for convenience of use). In both cases, the support plates 47, 48 are adapted to receive a series of correspondingly configured batteries 49, which differ somewhat from the batteries 1 used in conjunction with the support plates 5 illustrated in FIGS. 1 to 4.

The support plate 48 (as well as the support plate 47) includes a series of U-shaped pedestals 46 for receiving complimentary (U-shaped) recessed portions 45 of the batteries 49, and a series of cavities 36 for receiving the stands 15 of the batteries 49 which project from opposite sides of the recessed portions 45. This provides a secure and stable connection between the batteries 49 and the support plate 48 which is to receive them, while also providing a protective area for the stands 15. The pedestals 46 of the support plate 48 are provided with a series of grooves 35 which allow for cooling of the batteries while in operation. The cavities 36 are provided with positive and negative terminals 20 (which are appropriately electrically interconnected within the support plate 48) for electrical connection with the several batteries 49 which are to be received.

Figure 7A:
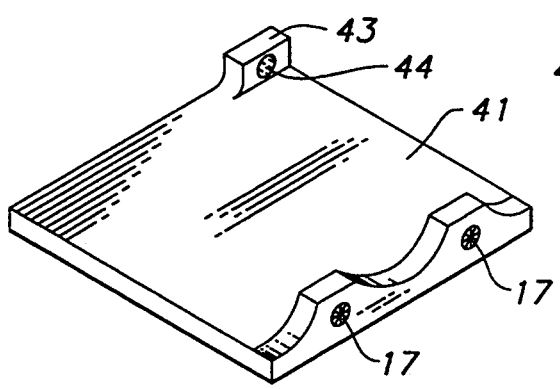
FIGS. 7a and 7b are isometric views showing positive and negative terminal plates for use with the alternative embodiment batteries of FIGS. 5 and 6.
Figure 7B:
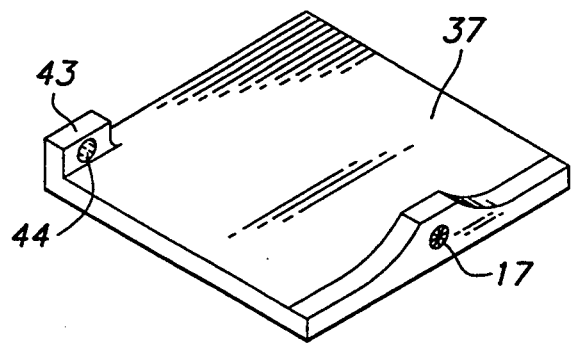

Internally (as shown in FIG. 5), the batteries 49 are assembled between internal walls 38 and within spaces 39 (i.e., cell compartments) for receiving the conventional elements (not shown for ease of illustration) of a storage battery (i.e., plate groups and electrolyte). A pair of plates 37, 41 are then used to electrically connect terminal posts (not shown for ease of illustration) of the plate groups received within the spaces 39 with the terminals 17 which are provided in the stands 15 of the battery 49. FIG. 7a shows a plate 37 which is used for electrically connecting the negative terminal of the battery 49 with the terminals 17, while FIG. 7b shows a plate 41 for electrically connecting the positive terminal of the battery 49 with the terminals 17.

In each case, the plate 37, 41 is provided with lugs at opposing ends which are used for purposes of interconnection. The negative plate 37 of FIG. 7a includes a lug 43 having an aperture 44 for receiving the corresponding terminal post of the battery, and an opposing lug having a single terminal 17 (similar to the single terminal 17 of FIG. 2) for engaging the terminals 20 of the cavity 36 of the support plate 48. The positive plate 41 of FIG. 7b also includes a lug 43 having an aperture 44 for receiving the corresponding terminal post of the battery, and an opposing lug having a pair of terminals 17 (similar to the paired terminals 17 of FIG. 2) for engaging the terminals 20 of the cavity 36 of the support plate 48. It should be noted that the lug 43 shown in FIG. 7a is on an opposite side of the plate as is the lug 43 shown in FIG. 7b. This is done to accommodate traditional placement of the terminal posts of conventional storage batteries. It should also be noted that the plate 37 of FIG. 7a has a single terminal 17, while the plate 41 of FIG. 7b has two such terminals 17. This is done to accommodate the polarity-defining location of the terminals 20 associated with the cavity 36 of the support plate 48, as previously described in connection with the alternative embodiments of FIGS. 1 to 4.

Externally, the batteries 49 include a surrounding container having characteristics similar to the container of the battery 1 shown in FIG. 1. The container includes a cover 42 having fill holes 44 for receiving electrolyte in conventional fashion, retractable handles 2 and corresponding recesses 3 for receiving them.(as previously described in connection with the battery 1 shown in FIG. 1), and a voltage controller 40 for purposes of regulating the system's output characteristics.

I claim:

1. A system for supplying electric power to a battery operated vehicle which comprises a support plate for receiving a battery, wherein the support plate and the battery have complementary means for detachable mechanical and electrical connection with each other including first terminals projecting upwardly from the support plate and second terminals formed in and projecting downwardly from bottom portions of the battery, for establishing an enclosed, mated engagement between the first terminals and the support plate, and the second terminals and the battery, responsive to means for maintaining the battery in position on the support plate including the weight of the battery, and wherein the support plate includes means for series electrical connection or a shunt connection of the battery and means for receiving electrical cables for supplying electric power to a utilization point associated with the vehicle.

2. The system of claim 1 wherein the maintaining means further includes a mechanical fastener.

3. The system of claim 1 wherein the maintaining means further includes a magnetic element associated with the support plate, and a metal element associated with the battery and positioned for engagement by the magnetic element associated with the support plate.

4. The system of claim 3 wherein the magnetic element is an electromagnet.

5. The system of claim 1 wherein the battery includes a container having articulated handles associated therewith.

6. The system of claim 5 wherein the handles are receivable within recesses formed in the container.

7. The system of claim 1 wherein the battery and the support plate include escutcheons for receiving alignment markings.

8. The system of claim 1 wherein the support plate includes means for electrical connection with an external element.

9. The system of claim 8 wherein the external element is another support plate.

10. The system of claim 8 wherein the external element is the electrical cables for supplying electric power to the utilization point.

11. The system of claim 8 wherein the connection means is a conducting element located within the support plate and having a bore for receiving an electrical connector.

12. The system of claim 11 wherein the conducting element is located within longitudinal edge portions of the support plate, and wherein the bore is formed at a central location along the longitudinal edge portions of the support plate.

13. The system of claim 11 wherein the conducting element is located within longitudinal edge portions of the support plate, and wherein the bore is formed in lateral edge portions of the conducting element.

14. The system of claim 1 wherein the support plate is formed of an electrically insulating material, and wherein the conducting element is located within longitudinal edge portions of the support plate.

15. The system of claim 1 wherein a conducting element is located within each of two, opposing longitudinal edge portions of the support plate.

16. The system of claim 1 wherein the terminals of the battery are formed as sockets for receiving male terminals associated with the support plate.

17. The system of claim 16 wherein the battery and the support plate include means for aligning the terminals so that polarities of the terminals of the battery match polarities of the terminals of the support plate.

18. The system of claim 17 wherein a terminal of a first polarity includes a single socket for receiving a single male terminal extending from the support plate, and a terminal of a second polarity includes paired sockets for receiving paired male terminals extending from the support plate.

19. The system of claim 16 wherein the male terminals include threaded portions for engaging threads formed in conducting elements associated with the support plate.

20. The system of claim 1 wherein the container is formed of an electrically insulating material, and wherein the battery terminals are surrounded by an access area formed in the insulating material which forms the container.

21. The system of claim 1 wherein the support plate includes a pedestal for receiving a corresponding recessed portion formed in the battery.

22. The system of claim 11 wherein the terminals include cooperating, longitudinal grooves formed therein, for strengthening the mechanical and electrical connection.

23. The system of claim 1 which includes a plurality of batteries, and a plurality of support plates for detachably receiving the batteries, wherein the plurality of support plates are electrically connected with one another.

24. The system of claim 23 which includes a plurality of connector links for electrically connecting the support plates.

25. The system of claim 24 wherein the support plates are formed of an electrically insulating material, wherein conducting elements are located within the support plates, and wherein the conducting elements have bores for receiving the connector links.

26. The system of claim 25 wherein the conducting elements include threaded bores extending to the bores for receiving the connector links, for receiving threaded elements for engaging received connector links.

27. The system of claim 1 which includes a plurality of batteries, and a support plate for detachably receiving the plurality of batteries, wherein the support plate incorporates conducting parts for electrically connecting the plurality of batteries.

28. The system of claim 27 wherein the support plate includes a plurality of pedestals having recessed channels on opposing sides thereof, and wherein the batteries have bases which include recessed portions for engaging the pedestals of the support plate.

29. The system of claim 28 wherein the batteries have terminals for electrical connection with the support plate, wherein the terminals are located within stands projecting from opposing sides of the batteries located on either side of the recessed portions, and wherein the stands of the batteries are receivable within the recessed channels of the support plate.

30. The system of claim 29 wherein the pedestals have grooves for promoting battery cooling.

31. The system of claim 29 wherein the terminals are electrically connected with plate groups forming the batteries by connecting plates located within side walls of the batteries.

32. A method for supplying electric power to a battery operated vehicle, comprising the steps of:

electrically connecting a support plate associated with the vehicle to a utilization point for the electric power associated with the vehicle, the support plate including complementary means for electrically and mechanically connecting the support plate with at least one battery, and means for electrically connecting the battery in a series electrical connection or a shunt connection;

electrically and mechanically connecting a battery with the support plate, for detachable connection with the support plate, by placing first terminals projecting upwardly from the support plate in contact with second terminals formed in and projecting downwardly from bottom portions of the battery, establishing an enclosed and mated engagement between the first terminals and the support plate, and the second terminals and the battery; and maintaining the battery in position on the support plate responsive to the weight of the battery.

33. The method of claim 32 wherein the method further comprises the step of simultaneously bringing the connecting terminals of the battery into engagement with the connecting terminals of the support plate as the battery is mechanically connected with the support plate.

34. The method of claim 33 which further comprises the steps of disconnecting a first, discharged battery from the support plate, and connecting a second, charged battery with the support plate, replenishing the supply of electric power to the vehicle and extending operations of the vehicle.

35. The system of claim 20 wherein the access area formed in the container forms an enclosure with portions of the support plate adjacent to the access area.

36. The method of claim 32 which further includes the step of forming an enclosure between the bottom of the battery and adjacent surface portions of the support plate.

* * * * *